United States Patent [19]
Haland et al.

[11] Patent Number: 4,832,280
[45] Date of Patent: May 23, 1989

[54] SAFETY BELT REEEL ASSEMBLY

[75] Inventors: Lars Y. Haland, Falsterbo; Mats A. Karlin, Vargarda, both of Sweden

[73] Assignee: General Engineering (Netherlands) B.V., Utrecht, Netherlands

[21] Appl. No.: 112,858

[22] Filed: Oct. 27, 1987

[30] Foreign Application Priority Data

Oct. 29, 1986 [GB] United Kingdom ................. 8626005

[51] Int. Cl.4 ............................................ B60R 22/34
[52] U.S. Cl. ...................................... 242/107; 242/76
[58] Field of Search ................ 242/107, 107.1, 107.12, 242/107.13, 107.14, 107.15, 107.2, 107.4 R-107.4 E, 76; 280/801, 803, 806, 807, 808; 297/475-478, 481

[56] References Cited

U.S. PATENT DOCUMENTS

| 3,869,097 | 3/1975 | Peel et al. | 242/107 |
| 4,372,613 | 2/1983 | Kitakami et al. | 242/107 X |
| 4,373,749 | 2/1983 | Miki et al. | 280/807 |
| 4,542,939 | 9/1985 | Geoffrey | 297/481 |

FOREIGN PATENT DOCUMENTS 2818246 10/1979 Fed. Rep. of Germany ...... 242/107

Primary Examiner—John M. Jillions
Attorney, Agent, or Firm—Spencer & Frank

[57] ABSTRACT

A safety belt reel assembly comprises a supporting frame, a safety belt, one end of the safety belt being attached to a spindle which may be rotatably mounted on said frame, an arrangement for automatically winding said belt onto said spindle, and a movable belt guide. The belt guide serves to ensure that the safety belt arrives at the take up point of the belt roll on the spindle in a desired orientation. This is achieved by providing a two component guide, a first component being mounted on the frame of the reel assembly and the second component being rotatably mounted on the first component and defining an elongate slot through which the safety belt may pass. With the second component rotatably mounted on the first component, the longitudinal axis of the slot through which the belt passes may rotate from a position where it lies parallel to the longitudinal axis of the reel spindle to a position where it is no longer parallel to the longitudinal spindle axis.

25 Claims, 3 Drawing Sheets

SAFETY BELT REEEL ASSEMBLY

BACKGROUND TO THE INVENTION

The present invention relates to a safety belt reel assembly, and more particularly to a safety belt reel assembly for use in connection with a safety belt mounted in a vehicle.

Many vehicles are today fitted with seat belts which are wound on so-called inertia reels. The inertia reel is spring loaded and will tend to wind in any slack in the seat belt once the belt has been positioned on an occupant in the vehicle, and will also tend to wind in the seat belt when the belt is removed from the occupant in the vehicle.

In a conventional reel assembly a central spindle is rotatably mounted within a support, with one end of a seat belt being attached to the spindle so that the seat belt may be wound around the spindle. If the length of belt to be wound onto the spindle arrives at the take up point of the roll of belt on the spindle in a direction such that it is aligned with the roll, then the belt will be wound in automatically by the spring loading of the spindle. However, if the length of belt to be wound in arrives at the take up point of the roll with it longitudinal axis not perpendicular to the longitudinal axis of the spindle, i.e. if the belt approaches the take up point of the roll from one side of the roll in the width direction of the belt, or if the length of belt to be wound in approaches the take up point whilst in a twisted condition, then the belt may snag and be prevented from being wound onto the spindle. It is therefore desirable to provide some form of guide for the seat belt, so that the belt arrives at the roll in the desired orientation and is wound onto the reel evenly and under uniform tension across the width of the belt.

It has been previously proposed to provide a reel assembly with a belt guide in the form of an elongate slot, the guide being mounted on a seat belt reel assembly with its longitudinal axis aligned parallel to the axis of the spindle on which the belt is wound. The belt guide is movably mounted on the reel assembly so that it is always positioned in alignment with the take up point of the belt roll, i.e. the guide slot is capable of moving in the diametral direction of the roll, with the slot being retained parallel to the longitudinal axis of the belt roll at all times. Whilst this particular arrangement ensures that the belt arrives at the take up point of the roll in the desired orientation, it may cause excessive belt wear if the belt arrives at the guide whilst twisted or if the belt arrives at the guide from one side, in the width direction of the belt. These problems have been encountered particularly in connection with automatic seat belt systems for motor vehicles, which automatically place a seat belt on an occupant in the vehicle.

OBJECT OF THE INVENTION

The present invention seeks to provide an improved safety belt reel assembly which does not suffer from the above mentioned problems.

BRIEF SUMMARY OF THE INVENTION

According to a first aspect of the present invention there is provided a safety belt reel assembly for use in a vehicle, said assembly comprising a supporting frame, said frame being provided with means for mounting said assembly in a vehicle: a belt; a spindle, said spindle being adapted to be rotatably mounted on said frame for rotation about its central, longitudinal axis and being further adapted to receive one end of said belt, such that the belt may be wound around said spindle to form a belt roll:. an arrangement for automatically winding said belt on said spindle; and movable belt guide to guide said belt onto said roll upon automatic winding of said belt onto said spindle, said guide defining an elongate slot through which said belt may be passed, said slot having a longitudinal axis, and the guide being movable so that the longitudinal axis of said slot may move from a position where it is parallel to the longitudinal axis of said spindle to a position where it is no longer parallel to said longitudinal axis of said spindle.

Preferably, said guide comprises a first component adapted to be mounted on said frame and a second component adapted to be rotatably mounted on said first component, said second component defining said slot.

Conveniently, when in use, the degree of rotational movement of said second component is limited.

Advantageously, said second component can move clockwise and anti-clockwise from said position in which the slot is parallel with the axis of the spindle.

In one embodiment of the present invention said second component may rotatate about an axis located adjacent one longitudinal side of said slot.

Conveniently, said axis about which said second component may rotate passes through the point where said second component is mounted on said first component.

Preferably, said second component is mounted on said first component by means of a pin on the one component engaging in an appropriately dimensioned bore in the other component. The pin may be provided on said first component and said bore may be provided in a substantially flat projection provided on one side of said second component.

Advantageously, said pin is provided on a depressed part of said first component, the arrangement being such that said projection of said second component may be inserted into a space defined between said depressed part and a substantially planar surface of said first component, the pin on said depressed part engaging in said bore in said projection with a snap fitting action such that the projection is retained in position between said depressed part and said surface with said second component being free to rotate about said pin.

The projection may be provided with a bevelled edge and said pin may have an upper surface which is not perpendicular to the longitudinal axis of said pin, in order to assist the insertion of said projection in said space.

Preferably, said axis is located adjacent an edge of said first component, the rotation of said second component relative to said first component being limited by abutment of the second component with an edge of said first component.

The first component may be adapted to be mounted on said frame with a snap fitting action, and may be further provided with lugs which serve to assist with correct positioning of the first component on said frame.

In a second and third embodiment of the present invention said second component is adapted to rotate about a point substantially coincident with the mid point of said slot.

Preferably, said first component is provided with a circular aperture portion located approximately centrally therein, there being a further aperture portion extending away from each of two opposed sides of said circular aperture portion, said further aperture portions increasing in width with distance from said circular aperture portion, the resultant aperture being dimensioned so that said belt may be passed therethrough.

Conveniently, the second component is rotatably mounted on said first component by means of a lip provided on one component engaging in a corresponding groove provided in the other component. The lip may be provided on said second component and said groove may be provided on said first component, and said lip and said groove may each constitute part of the circumference of a circle having a mid-point coincident with said point about which said second component rotates.

In the second embodiment of the present invention said lip forms at least one side of said second component, and said second component is received in a recess defined by two walls of said first component, said groove being cut at the base of said walls, so that when mounted on the first component, an upper surface of said second component lies flush with an upper surface of said first component.

In the third embodiment said second component is provided on its underside, approximately centrally along the length of said slot, with a circular boss, said slot passing through said boss, said lip being integrally formed at the free end of said boss, and said groove is cut in the edge of the circular aperture portion provided approximately centrally in said first component.

In the second and third embodiment of the invention when said second component is mounted on said first component and a belt is passed through said aperture in said first component and said slot in said second component, the rotation of said second component is limited by abutment of said belt with the edges of said apertures and said slot.

Preferably, said first component is provided on its underside with a downwardly depending wall, and is further provided, along one edge with a lip, said first component being mounted on said frame by way of said wall and said lip.

According to a second aspect of the present invention there is provided a guide for a safety belt reel assembly, said assembly comprising a supporting frame; a belt; a spindle, said spindle adapted to be rotatably mounted on said frame for rotation about its central longitudinal axis and being further adapted to receive one end of said belt; an arrangement for automatically winding said belt on said spindle; said belt guide comprising a first component adapted to be mounted on said frame and a second component adapted to be rotatably mounted on said first component, said second component defining an elongate slot through which said belt may be passed, said slot having a longitudinal axis, the guide being movable so that the longitudinal axis of said slot may move from a position where it is parallel to the longitudinal axis of said spindle to a position where it is no longer parallel to said longitudinal axis of said spindle.

BRIEF INTRODUCTION TO THE DRAWINGS

DESCRIPTION OF PREFERRED EMBODIMENTS

Figure 1:
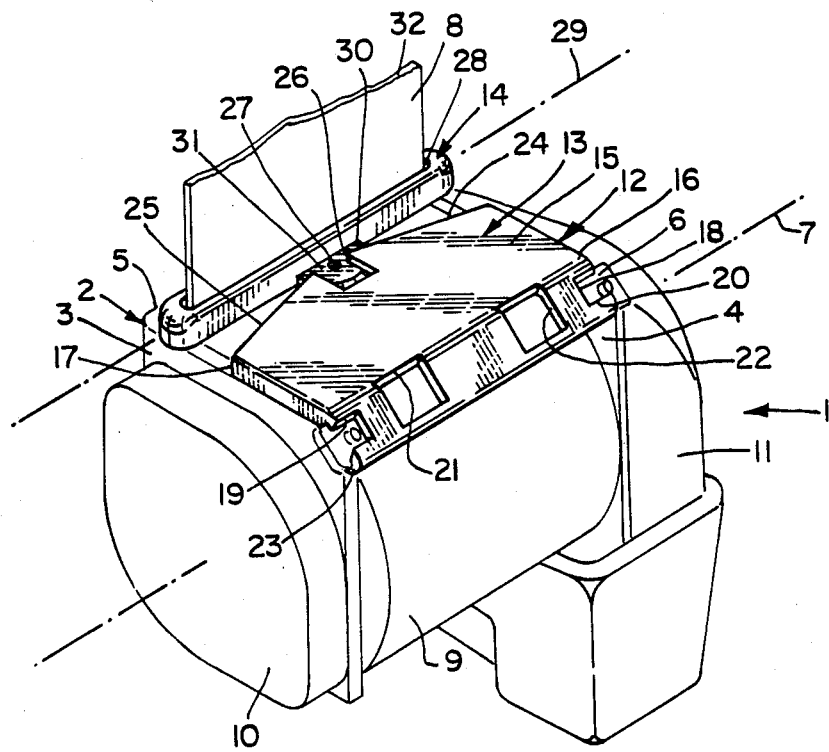
FIG. 1 is a perspective view of a safety belt reel assembly in accordance with the present invention.

Referring initially to FIG. 1, a safety belt reel assembly 1 comprises a supporting frame 2 comprising two parallel plate members 3, 4 formed integrally with an interconnecting plate 5. The interconnecting plate 5 is provided with bore holes suitable for mounting the frame 2 in a vehicle or for attaching components to the frame 2. The plate members 3, 4 are also interconnected by a transverse bar 6 mounted at the upper end of the plate members on the side thereof which is opposite the interconnecting plate 5. A spindle (not visible in the drawing) is rotatably mounted on the supporting frame 2 and has a central, longitudinal axis 7. One end of a belt 8 is attached to the spindle so that the belt may be wound around the spindle to form a roll 9.

Housings 10, 11 mounted on the exterior of each of the plate members 3, 4 contain the operative components of the safety belt mechanism. The components contained within the housings 10, 11 include a spring biasing arrangement which spring loads the spindle upon which the belt 8 is wound in an anti-clockwise direction as viewed from the left hand end of the reel assembly 1 shown in FIG. 1. Thus, when the belt 8 is attached to the spindle of the reel assembly, the belt will automatically be wound onto the spindle to form the roll 9. The components within the housings 10 and 11 also comprise means to prevent the reel paying out the seat belt when the reel is subjected to accident conditions.

The reel assembly 1 also comprises a belt guide 12. The belt guide 12 comprises a first component 13 which may be mounted on a part of the reel assembly 1 and a second component 14, the second component being movably mounted on the first component.

The first component 13 is a substantially flat component defining a planar upper surface 15 having two opposed parallel depending side walls 16, 17. One end of the planar surface 15 extends into an inclined face 18. The inclined face 18 is provide at its two ends with a rectangular cut-out 19, 20 and is also provided between its two ends with two substantially square apertures 21, 22. Although not visible in the drawings, the two edges of each aperture 21, 22 which lie perpendicular to the side walls 16, 17 are provided on their underside with depending, L-shaped, opposed projections, by way of which the first component 13 may be mounted on the transverse bar 6. The free edge of the inclined face 18 terminates with a shallow lip 23, the lip 23 merging with the depending, L-shaped projections at positions along its length adjacent the apertures 21, 22. The end of the planar surface 15 which is opposite the inclined face 18 is defined by two edges 24, 25 which are angled relative to one another and which extend from the side walls 16, 17 towards an outwardly facing point located substantially centrally between the two side walls 16, 17. The edges 24, 25 only extend as far as a rectangular shaped recess 26 provided centrally between the two side walls 16, 17 at the point where the two edges 24, 25 would otherwise meet. On its underside beneath the recess 26 the first component 13 is provided with a catch (not clearly visible in the drawings). The catch is in the form of a depending resilient foot extending towards the second component 14 as shown in FIG. 1. The foot is provided at its free edge with an upwardly projecting pin 27.

The second component 14 is in the form of an elongate member defining a slot 28, the slot 28 having a longitudinal axis 29. The second component 14 is provided centrally along its length, at its lower edge, with a substantially flat projection 30. The free side of the projection 30 which is opposite the side attached to the elongate member defines a point, there being two bevelled edges which meet centrally across the width of the projection 30 to define the point. The projection is provided with a bore hole 31 adjacent the point of connection of the projection 30 to the elongate member, the bore hole 31 being positioned approximately centrally across the width of the projection 30.

Attachment of the seat belt 8 to the spindle and the mounting of the spindle within the supporting frame 2 may be affected in a conventional manner, as may the assembly of the workings of the seat belt mechanism within the housings 10, 11. The guide 12 may then be mounted on the supporting frame 2 as follows: the first component 13 is designed so that it may be snap-fitted into place on the transverse bar 6 of the frame 2, by way of the projections provided on the underside of the inclined face 18 at the edges of tee apertures 21, 22. The underside of the planar surface 15 is also provided with downwardly depending pegs at its corners, at the junction of the edges 24, 25 with the side walls 16, 17. These downwardly depending pegs serve to facilitate the correct location of the first component 13 along the transverse bar 6, with the outer surfaces of the pegs engaging the inner surfaces, on the one side, of the plate member 3 and, o the other side, of the plate 4. A free end 32 of the seat belt 8 may then be passed through the elongate slot 28 in the second component 14 of the guide 12, and the second component 14 may then be slid along the length of belt 8 until the projection 30 is positioned adjacent the recess 26 in the first component 13. The projection 30 may then be pushed into the space between the upper surface 15 of the first component 13 and the foot which constitutes the catch on the first member 13, the bevelled edges of the projection 30 facilitating tee passing of the projection over the upstanding pin 27 provided on the foot, the upper surface of the pin also being inclined to assist with this insertion of the projection. The pin 27 will then snap into position in the bore hole 31 so that the second member 14 is pivotally connected to the first member 13. The reel is now assembled as shown in FIG. 1.

The belt 8 may be withdrawn from the roll 9 in the usual way and will be retracted automatically by the spring loaded spindle, with the guide 12 ensuring that the belt arrives at the take up point of the roll in the correct orientation. The second component 14 of the guide 12 may pivot about the upstanding pin 27 and the rotation of this second component is limited by its engagement with the edges 24, 25 of the first component of the guide. Thus the second component 14 may pivot about a point adjacent the mid point of one long side of the slot 28 from a position in which the slot is parallel to the axis of the reel, to a position in which it is not parallel therewith.

Figure 2:
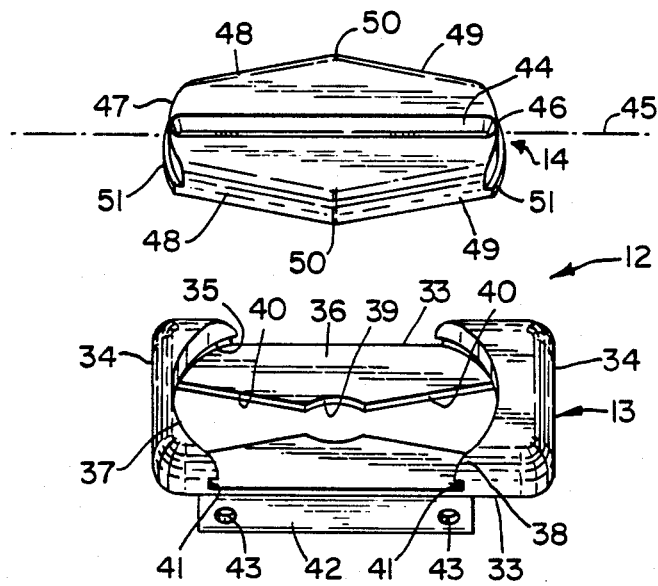
FIG. 2 shows, in exploded perspective view, an alternative embodiment of a seat belt guide for use in a safety belt reel assembly according to the present invention.

FIG. 2 shows an alternative embodiment of a belt guide 12 suitable for mounting on a reel assembly as previously described. This second embodiment also comprises a first component 13 which may be mounted on the frame 2 of the reel assembly, and a second component 14 which may be movably mounted on the first component 13.

The first component 13 is an integrally formed, substantially rectangular member having two pairs of opposed parallel sides 33, 3 4. The first component 13 has a substantially circular recess 35 in its upper surface, the opposed sides 33 of the component constituting cords o the circle defined by the recess. The recess 35 effectively defines a planar base portion 36 between two upstanding walls 37, 38. The base portion 36 of the first component 13 has a centrally positioned circular aperture portion 39, which has, extending from opposed sides thereof too further aperture portions 40 of wing shape, which extend towards the upstanding walls 37, 38. The aperture portions 40 increase in width as they extend towards the upstanding walls 37, 38. Thus one large aperture of a specific shape is formed in the base portion 36. At the junction of the upstanding walls 37, 38 with the planar base portion 36 of the first component 13, the walls 37, 38 are provided with an undercut groove 41. The undercut groove 41 has a rectangular cross-section and extends between the opposed, parallel sides 33 and constitutes part of the circumference of a circle having its mid-point at the centre of the circular aperture 39. Adjacent one edge 33 of the first component 13 there is provided, on the underside, a downwardly depending wall 42, the wall 42 extending perpendicularly away from the underside of the first component. The wall 42 is provided adjacent each end thereof with a circular bore 43, by way of which the first component 13 may be mounted on the frame 2 of the reel assembly. The wall 42 is intended to be connected to the interconnecting plate 5, and thus the orientation of the components illustrated in FIG. 2 is reversed relative to the reel shown in FIG. 1.

The second component 14 of the second embodiment of belt guide 12 is an integrally formed member defining an elongate slot 44, having a central, longitudinal axis 45. The second component 14 has a thickness substantially equal to the depth of the upstanding walls 37, 38 of the first component 13 and is bound on two opposed sies by arcuate edges 46, 47 which constitute part of the circumference of a circle having a mid point substantially in the centre of the second component 14. The remaining opposed sides of the second component 14 are each formed by too straight edges 48, 49 which extend outwardly from the arcuate edges 66, 47 and meet at a point 50. At the base of the arcuate edges 46, 47 the second component 14 is provided with outwardly projecting lip 51, the lip 51 being dimensioned so that it may engage within the undercut groove 41 provided in the first component 13.

The diameter of the circle, part of the circumference of which is defined by the arcuate edges 46, 47 is approximately equal to or slightly less than the diameter of the circular recess 35 cut in the first component 13 so that the first component 13 and the second component 14 may be brought together, with the lip 51 on the second component engaging in the undercut groove 41 on the first component. In order to effect this engagement the second component 14 is placed within the circular recess 35, with the longitudinal axis 45 of the elongate slot 44 extending perpendicularly across the opposed, parallel sides 33 of the first component. The second component may then be rotated about its central point in order to effect engagement of the lip 51 in the undercut groove 41. The second component 14 is now held within the first component 13 and may rotate about its central point, which lies within the slot 44 approximately centrally along the length thereof.

As previously mentioned the first component 13 may be mounted on the frame 2 of the reel assembly by way of the bore holes 43 provided in the depending wall 42. With the second component 14 already mounted on the first component 13, the first component 13 is mounted on the frame 2 by initially passing the free end 32 of the belt 8 through the elongate slot 44 in the second component 14 and then placing the first component 13 on top of the frame 2, with the depending wall 42 positioned against the inside surface of the interconnecting plate 5 of the frame. The bore holes 43 in the wall 42 are then aligned with bores provided in the interconnecting plane 5 and the first component 13 may be secured to the frame 2 by way of screws or the like passing through the frame and the depending wall 42. In order to assist with the retention of the first component 13 in position on the frame 2 a lip is provided on the underside of the side 33 of the first component which is opposite the side provided with the depending wall 42. This lip engages underneath the transverse bar 6 of the frame 2. The seat belt 8 may now be withdrawn from the roll 9 in the usual manner and will be retracted automatically by the spring loaded spindle of the reel, with the second component 14 of the belt guide 12 pivoting about a point approximately centrally along its longitudinal axis 45 to ensure that the belt arrives at the take up point of the roll 9 in the desired orientation. As the second component 14 pivots so the axis of the elongate slot 44 may move from a position in which it is parallel with the axis of the reel to a position in which it is not parallel therewith. The rotation of the second component 14 is limited by the engagement of the belt 8 with the edges of the apertures 40, and the slot 44.

Figure 3:
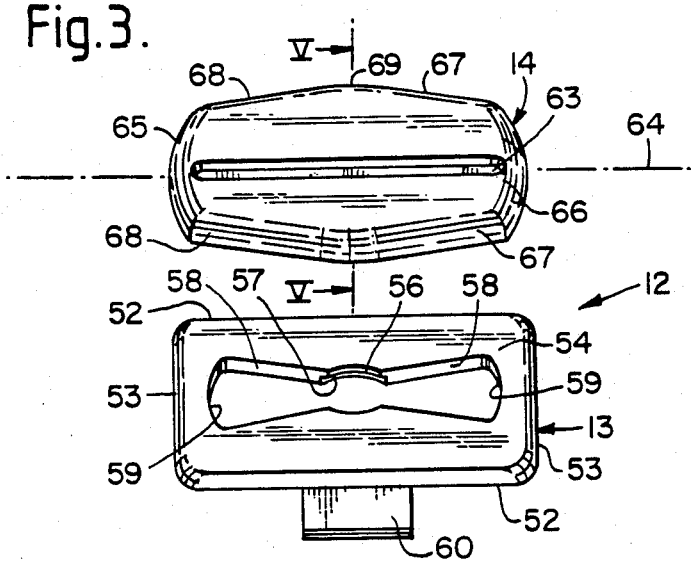
FIG. 3 shows, in exploded perspective view from above, a further embodiment of a seat belt guide for use in a safety belt reel assembly in accordance with the present invention.
Figure 4:
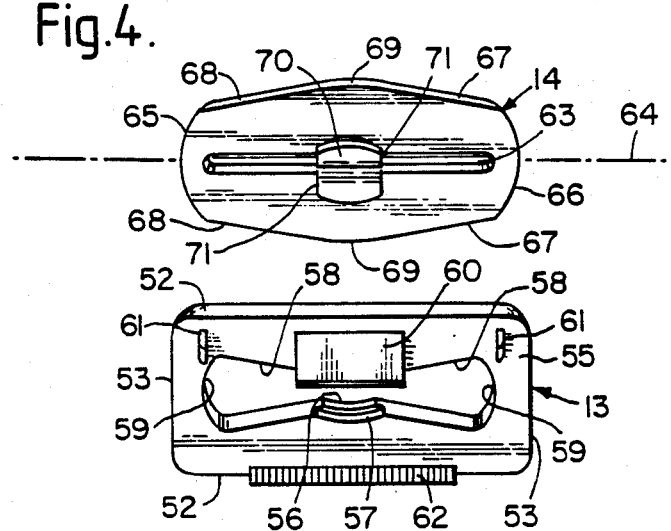
FIG. 4 shows the seat belt guide of FIG. 3 in exploded perspective view from underneath.

FIGS. 3 and 4 show a third embodiment of belt guide 12 for use on the previously described reel assembly. Again this third embodiment of guide comprises a first component 13 and a second component 14. As with the previously described embodiments, the first component 13 may be mounted on the frame 2 of the reel assembly whilst the second component 14 may be rotatably mounted on the first component 13.

The first component 13 of this third embodiment of belt guide 12 is an integrally formed, substantially flat, rectangular shaped member bound by two pairs of opposed parallel sides 52, 53. The first component 13 defines a planar upper surface 54 and a planar underside surface 55, shown in FIG. 4. A circular aperture portion 56 is located approximately centrally in the first component 13, there being an undercut groove 57 provided beneath the circular aperture 56. Two further aperture portions 58, which form an integral aperture with the central aperture portion extend away from opposed sides of the circular aperture 56, the aperture portions 58 increasing in width as they extend away from the circular aperture portion 56 in a direction towards the opposed parallel sides 53 of the first component 13. The extreme outer edges 59 of the aperture portions 58 are arcuate edges and constitute part of the circumference of a circle having its mid point at the centre of the circular aperture 56. On its underside 55 the first component 13 is provided with a downwardly depending wall 60, the wall 60 being located between the circular aperture 56 and one edge 52 and extending perpendicularly away from the underside 55 of the first component. The first component 13 may be mounted on the frame 2 of the reel assembly 1 by way of the wall 60, which may be provided with one or more suitable bores. The wall 60 is intended to be mounted on the connecting plate 5. Thus the orientation of the arrangement shown in FIGS. 3 and 4 is reversed relative to the reel of FIG. 1. Two downwardly depending pegs 61 are provided on the underside 55 of the first component 13, the pegs being located adjacent the corners of the first component on the same side as the downwardly depending wall 60. The pegs 61 serve to assist with the correct positioning of the first component 13 on the frame 2 of the reel assembly 1. A lip 62 is provided along a central region of the edge 52 of the first component 13, this being the edge opposite the edge adjacent which the wall 60 is provided The lip 62 engages the transverse bar 6 of the frame 2 when the first component 13 is mounted on the frame and assists to retain the first component in position.

Figure 5:
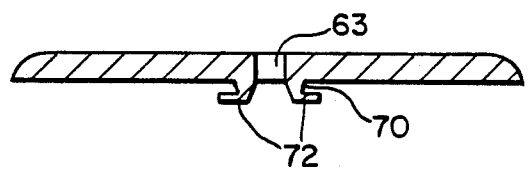
FIG. 5 is a cross section taken on line V—V of FIG. 3.

The second component 14 of the third embodiment of the belt guide 12 is an integrally formed member again defining an elongate slot 63 having a central, longitudinal axis 64. The second component 14 is bound on two opposed sides by arcuate edges 65, 66 and is bound on each of the two remaining opposed sides by a pair of straight edges 67, 68. The straight edges 67, 68 extend outwardly from the arcuate edges 65, 66 and meet at a rounded point 69. As may be seen most clearly in FIGS. 4 and 5, the second component 14 is provided centrally on its underside with a downwardly depending partly circular boss 70, the slot 63 passing centrally through the boss 70. The boss 70 has two opposed parallel edges 71, these edges effectively constituting cords of a circle having a mid point centrally between the two edges and in the centre of the slot 63. The free end of the boss 70 is provided with an outwardly projecting lip 72, (see FIG. 5) the lip 72 being dimensioned so that it may engage within the undercut groove 57 provided in the first component 13.

The second component 14 may be rotatably mounted on the first component 13 by positioning the second component upon the upper surface of the first component so that the longitudinal axis 64 of the slot 63 extends perpendicularly across the opposed parallel edges 52 of the first component and so that the boss 70 and lip 72 may project downwardly through the circular aperture 56. The boss 70 is designed with the two opposed straight edges 71 so that it may pass through the circular aperture 56 when in the above described orientation. The second component 14 may now be rotated about its central point and this will bring the lip 72 into engagement with the undercut groove 57 in the first component so that the two components are now engaged.

The guide 12 may be mounted on the frame 2 of the reel assembly 1 by initially passing the free end 32 of the belt 8 through apertures in the first component and the slot 63 in the second component and then placing the first component upon the top of the frame 2 with the downwardly depending wall 60 adjacent the inside surface of the interconnecting plate 5. The pegs 61 on the underside of the first component will fit adjacent the inside surfaces of the parallel plate members 3, 4 of the frame and assist with correct positioning of the first component on the frame. The lip 62 on the underside of the first component will snap into position underneath the transverse bar 6 of the frame 2 and the first component may now be secured to the frame by means of screws passing through bores in the interconnecting plate 5 and through the downwardly depending wall 60 of the first component.

With the belt guide 12 mounted on the reel assembly the belt 8 may be withdrawn from its roll 9 in the usual way and the belt will be retracted automatically by the spring loaded siindle of the reel assembly, with the second component 14 of the guide 12 being free to pivot about its central point in order to ensure that the belt arrives at the take up point of the roll in the desired orientation. As the component 14 pivots so the axis of the elongate slot 63 may move from a position in which it is parallel with the axis of the reel to a position in which it is not parallel therewith. As with the second embodiment of guide 12, the rotation of the second component 14 of the third embodiment is also limited by the engagement of the belt 8 with the edges of the aperture portions 58 and the slot 63.

It will be readily appreciated that many modifications and alterations may be made to the above described embodiments without departing from the scope of the present invention. For example, it would be possible for the lip and groove to be provided on the first component and second component of the belt guide respectively in the second and third embodiments described. It would also be possible to provide the first components with alternative means for attaching it to the frame 2 of the reel assembly.

What is claimed is:

1. A safety belt reel assembly for use in a vehicle, comprising:
    a support frame, said frame, being provided with means for mounting said assembly to a vehicle;
    a belt;
    a spindle, said spindle being adapted to be rotatably mounted on said frame for rotation about its central, longitudinal axis and being further adapted to receive one end of said belt, such that the belt may be wound around said spindle to form a belt roll;
    an arrangement for automatically winding said belt on said spindle; and
    a moving belt guide said belt onto said roll upon automatic winding of said belt onto said spindle, said guide including a first component adapted to be mounted on said frame and a second component adapted to be rotatably mounted on said first component, said second component defining an elongate slot through which said belt may be passed, said slot having a longitudinal axis, said first component having a pin, said second component having a substantially flat projection on one side thereof, said projection having a bore adjacent one longitudinal side of said slot, said pin being engaged in said bore so that said second component is rotatable about a pivot axis through said bore and said pin so that the longitudinal axis of said slot may move from a position where it is parallel to the longitudinal axis of said spindle to a position where it is no longer parallel to said longitudinal axis of said spindle, said pin being provided on a depressed par of said first component, said projection being insertable into a space defined between said depressed part and a substantially planar surface of said first component, said pin engaging said bore in said projection with a snap fitting action such that said projection is retained in position between said depressed part and said planar surface with said second component being free to rotate about said pin.

2. An assembly according to claim 1, wherein, in use the degree of rotational movement of said second component is limited.

3. An assembly according to claim 1, wherein said second component can move clockwise and anti-clockwise from said position in which the slot is parallel with the axis of the spindle.

4. An assembly according to claim 1, wherein said projection is provided with a bevelled edge and said pin has an upper surface which is not perpendicular to the longitudinal axis of said pin, in order to assist the insertion of said projection in said space.

5. An assembly according to claim 1, wherein said pivot axis is located adjacent an edge of said component, the rotation of said second component relative to said first component being limited by abutment of the second component with an edge of said first component.

6. An assembly according to claim 1, wherein said first component is adapted to be mounted on said frame with a snap fitting action, said first component being further provided with lugs which serve to assist with correct positioning of the first component on said frame.

7. A belt guide for a safety belt reel assembly which includes a supporting frame, a belt, a spindle adapted to be rotatably mounted on the frame for rotation about its central, longitudinal axis and to receive one end of the belt and an arrangement for automatically winding the belt on the spindle, the belt guide comprising:
    a first component adapted to be mounted on the frame, and
    a second component adapted to be rotatably mounted on said first component, said second component defining an elongate slot through which the belt may be passed, said slot having a longitudinal axis, said first component having a pin, said second component having a substantially flat projection on one side thereof, said projection having a bore adjacent one longitudinal side of said slot, said pin being engaged in said bore so that said second component is rotatable about a pivot axis through said bore and said pin so that the longitudinal axis of said slot may move from a position where it is parallel to the longitudinal axis of said spindle to a position where it is no longer parallel to said longitudinal axis of said spindle, said pin being provided on a depressed part of said first component, said projection being insertable into a space defined between said depressed part and a substantially planar surface of said first component, said pin engaging said bore in said projection with a snap fitting action such that said projection is retained in position between said depressed part and said planar surface with said second component being free to rotate about said pin.

8. A belt guide as in claim 7, comprising means for limiting the degree of rotational movement of said second component.

9. A belt guide as in claim 7, wherein said second component is movable clockwise and counter-clockwsie from said position in which said slot is parallel with longitudinal axis of said spindle.

10. A belt guide as in claim 7, wherein said projection is provided with a bevelled edge and said pin has an upper surface which is not perpendicular to the longitudinal axis of said pin, in order to assist the insertion of said projection in said space.

11. A belt guide as in claim 7, wherein said pivot axis is located adjacent an edge of said first component, the rotation of said second component relative to said first component being limited by abutment of the second component with an edge of said first component.

12. A belt guide as in claim 7, wherein said first component is adapted to be mounted on the frame with a snap fitting action, said first component being further provided with lugs which serve to assist with correct positioning of the first component on the frame.

13. A safety belt reel assembly for use in a vehicle, comprising:
a support frame, said frame being provided with means for mounting said assembly to a vehicle;
as belt;
a spindle, said spindle being adapted to be rotatably mounted on said frame for rotation about its central, longitudinal axis and being further adapted to receive one end of said belt, such that the belt may be wound around said spindle to form a belt roll;
an arrangement for automatically winding said belt on said spindle; and
a moving belt guide to guide said belt onto said roll upon automatic winding of said belt onto said spindle, said guide including a first component adapted to be mounted on said frame and a second component to be rotatably mounted on said first component, said second component defining an elongate slot through which said belt may be passed, said slot having a longitudinal axis, said first component having two walls defining a recess and having a groove cut in a base thereof, said second component being rotatably mounted on said first component by means of a lip of said second component engaging in said groove so that an upper surface of said second component lies flush with an upper surface of said first component and said second component is rotatable about a point substantially coincident with the mid point of said slot so that the longitudinal axis of said slot may move from a position where it is parallel to the longitudinal axis of said spindle to a position where it is no longer parallel to said longitudinal axis of said spindle.

14. An assembly according to claim 13, wherein said lip and said groove each constitute part of the circumference of a circle having a mid-point coincident with said point about which said second component rotates.

15. An assembly according to claim 13, wherein said first component is provided on its underside with a downwardly depending wall, and is further provided, along one edge with a lip, said first component being mounted on said frame by way of said wall and said lip.

16. A safety belt reel assembly for use in a vehicle, comprising:
a support frame, said frame being provided with means for mounting said assembly to a vehicle;
a belt;
a spindle, said spindle being adapted to be rotatably mounted on said frame for rotation about its central, longitudinal axis and being further adapted to receive one end of said belt, such that the belt may be wound around said spindle to form a belt roll;
an arrangement for automatically winding said belt on said spindle; and
a moving belt guide to guide said belt onto said roll upon automatic winding of said belt onto said spindle, said guide including a first component adapted to be mounted on said frame and a second component having an elongate slot through which said belt may be passed, said slot having a longitudinal axis and being adapted to be rotatably mounted on said first component so as to rotate about a point substantially coincident with the mid point of said slot so that the longitudinal axis of said slot may move from a position where it is parallel to the longitudinal axis of said spindle to a position where it is no longer parallel to said longitudinal axis of said spindle, said first component having a circular aperture portion located approximately centrally therein and a further aperture portion extending away from each of two opposed sides of said circular aperture portion, said further aperture portion increasing in width with distance from said circular aperture portion so that the resultant composite aperture is dimensioned so that said belt may be passed therethrough.

17. An assembly according to claim 16, wherein said second component is rotatably mounted on said first component by means of a lip provided on one component engaging in a corresponding groove provided in the other component.

18. An assembly according to claim 17, wherein said lip is provided on said second component and said groove is provided on said first component.

19. An assembly according to claim 17, wherein said lip and said groove each constitute part of the circumference of a circle having a mid-point coincident with said point about which said second component rotates.

20. An assembly according to claim 17, wherein said lip forms at least one side of said second component.

21. An assembly according to claim 17, wherein said second component is received in a recess defined by two walls of said first component, said groove being cut at the base of said walls, so that when mounted on the first component, an upper surface of said second component lies flush with an upper surface of said first component.

22. An assembly according to claim 17, wherein said second component is provided on its underside, approximately centrally along the length of said slot, with a circular boss, said slot passing through said boss, said lip being integrally formed at the free end of said boss.

23. An assembly according to claim 22, wherein said groove is cut in the edge of the circular aperture portion provided approximately centrally in said first component.

24. An assembly according to claim 16, wherein when said second component is mounted on said first component and a belt is passed through said aperture in said first component and said slot in said second component, the rotation of said second component is limited by abutment of said belt with the edges of said apertures and said slot.

25. An assembly according to claim 16, wherein said first component is provided on its underside with a downwardly depending wall, and is further provided along one edge with a lip, said first component being mounted on said frame by way of said lip.

* * * * *